Nov. 6, 1956     A. A. COOK ET AL     2,769,372
THREE COMPONENT OBJECTIVES FOR PHOTOGRAPHIC
AND PROJECTION PURPOSES
Filed July 25, 1955

| EF = 100 mm. | | | | f:3.2 |
|---|---|---|---|---|
| Lens | N | V | Radii | Thicknesses |
| 1 | 1.638 | 55.0 | $R_1 = +38.0$ mm. | $T_1 = 6.6$ mm. |
| | | | $R_2 = \infty$ | $S_1 = 6.9$ |
| 2 | 1.620 | 36.0 | $R_3 = -73.0$ | $T_2 = 4.2$ |
| | | | $R_4 = +36.0$ | $S_2 = 8.7$ |
| 3 | 1.605 | 38.0 | $R_5 = +344.0$ | $T_3 = 2.2$ |
| 4 | 1.700 | 48.0 | $R_6 = +44.0$ | $T_4 = 7.2$ |
| | | | $R_7 = -55.1$ | BF = 82.9 |

| EF = 100 mm. | | | | f:3.5 |
|---|---|---|---|---|
| Lens | N | V | Radii | Thicknesses |
| 1 | 1.691 | 55.0 | $R_1 = +42.0$ mm. | $T_1 = 7.0$ mm. |
| | | | $R_2 = \infty$ | $S_1 = 9.9$ |
| 2 | 1.620 | 36.0 | $R_3 = -76.0$ | $T_2 = 4.2$ |
| | | | $R_4 = +37.0$ | $S_2 = 9.2$ |
| 3 | 1.605 | 38.0 | $R_5 = +356.0$ | $T_3 = 2.2$ |
| 4 | 1.700 | 48.0 | $R_6 = +42.0$ | $T_4 = 10.4$ |
| | | | $R_7 = -57.53$ | BF = 76.6 |

United States Patent Office 2,769,372
Patented Nov. 6, 1956

2,769,372

THREE COMPONENT OBJECTIVES FOR PHOTOGRAPHIC AND PROJECTION PURPOSES

Alan A. Cook, Rochester, and David C. Gilkeson, Irondequoit, N. Y., assignors to Wollensak Optical Company, Rochester, N. Y., a corporation of New York Application July 25, 1955, Serial No. 523,994

2 Claims. (Cl. 88—57)

The invention relates to an optical objective particularly intended for photographic and projector purposes.

An object of the invention is to provide a generally improved and more satisfactory object of the type having four elements grouped in three components.

Another object is to provide a comparatively simple and easily manufactured photographic lens which is highly corrected for spherical and chromatic aberration, astigmatism, distortion and field curvature, coma, and chromatic difference of magnification.

A further object of the invention is to provide a comparatively simple photographic objective which is suitable for use with both color and black and white film and which provides high contrast and uniformly good resolution over the total angular field.

These and other desirable objects may be attained in the manner disclosed as an illustrative embodiment of the invention in the following description and in the accompanying drawings forming a part hereof, in which.

The same reference numerals throughout the several views indicate the same parts.

Figures 1, 2, 3:
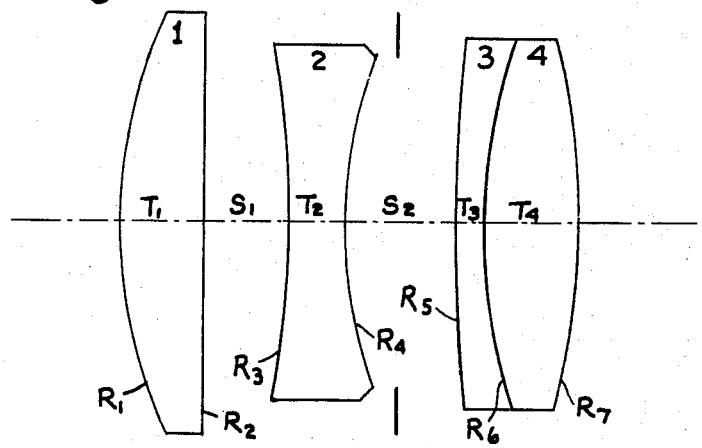
Fig. 1 is a diagrammatic view illustrating an objective constructed in accordance with a preferred embodiment of the present invention.
Fig. 2 is a table of data for one example of lens in accordance with Fig. 1.
Fig. 3 is a table of data for a second example.

The lens of the present invention is a triplet or three-component lens, the rear one of the components being made up of two cemented elements while the front and middle components each preferably consisted of single elements, so that the lens as a whole contains four elements. Lense of this general type are already known, the so-called "Tessar" lens being a familiar example. The present invention, however, provides a lens of larger aperture and one which is better corrected and more satisfactory in several respects, than prior lenses of the same general type. In particular, the lens of the present invention provides high contrast and uniformly good resolution over the total field, and a high degree of color correction which makes it very satisfactory for color photography and color projection and enlargement work, as well as for black and white.

Fig. 1 shows an objective according to the invention, and Fig. 2 shows the pertinent data for a first example thereof, here repeated for convenience in the following table. The lens elements are numbered in the customary manner from front to rear. The refractive indices N in this table and elsewhere throughout the specification are expressed with reference to the D line of the spectrum. The column V gives the dispersive indices. The radii of curvature R, the axial thicknesses T of the lens elements, and the spacing S between elements, are all expressed in the customary manner, in millimeters, and with the usual subscripts indicating the particular surface, lens thickness, or air space, numbered in sequence from front to rear. The + and − values of the radii R indicate surfaces respectively convex and concave toward the front, while a radius of infinity or ∞ indicates a plane surface. The values of R, T, and S are in millimeters for a lens having an equivalent focal length or EF of 100 millimeters, and may be varied proportionately for lenses of longer or shorter focal length.

*Example I*

| Lens | N | V | Radii, mm. | Thicknesses, mm. |
|---|---|---|---|---|
| 1 | 1.638 | 55.0 | $R_1 = +38.0$ | $T_1 = 6.6$ |
|   |       |      | $R_2 = \infty$ | $S_1 = 6.9$ |
| 2 | 1.620 | 36.0 | $R_3 = -73.0$ | $T_2 = 4.2$ |
|   |       |      | $R_4 = +36.0$ | $S_2 = 8.7$ |
| 3 | 1.605 | 38.0 | $R_5 = +344.0$ | $T_3 = 2.2$ |
| 4 | 1.700 | 48.0 | $R_6 = +44.0$ | $T_4 = 7.2$ |
|   |       |      | $R_7 = -55.1$ |  |

In this example, the diameter of lens 1 is 32 mm., diameter of lens 2 is 27 mm., and diameter of lense 3 and 4 is 28 mm. The rear face of lens 2 (that is, surface $R_4$) is beveled 45 degrees at a diameter of 25 mm. The diaphragm or stop is placed 4.4 mm. in front of lens 3, or substantially in the middle of the second air space.

When a lens is constructed according to the foregoing data, it has a back focal length or BF of 82.9 mm., and is adequately corrected for a maximum aperture of $f:3.2$ and a total angular field of 55°.

Data for a lens according to a second example of the present invention are given in Fig. 3 of the drawing, and are here repeated for convenience in the following table.

*Example II*

[EF = 100.0 mm.   BF = 76.6 mm.]

| Lens | N | V | Radii, mm. | Thicknesses, mm. |
|---|---|---|---|---|
| 1 | 1.691 | 55.0 | $R_1 = +42.0$ | $T_1 = 7.0$ |
|   |       |      | $R_2 = \infty$ | $S_1 = 9.9$ |
| 2 | 1.620 | 36.0 | $R_3 = -76.0$ | $T_2 = 4.2$ |
|   |       |      | $R_4 = +37.0$ | $S_2 = 9.2$ |
| 3 | 1.605 | 38.0 | $R_5 = +356.0$ | $T_3 = 2.2$ |
| 4 | 1.700 | 48.0 | $R_6 = +42.0$ | $T_4 = 10.4$ |
|   |       |      | $R_7 = -57.53$ |  |

The diameters of the lenses are the same as in the first example. The stop or diaphragm is in the middle of the second air space. The lens is adequately corrected for a maximum aperture of $f:3.5$ and a total angular field of 50°.

The lenses, in both examples given, are well corrected for spherical aberration, chromatic aberration, astigmatism, curvature of field, coma, distortion, and chromatic difference of magnification.

Some variations are possible without departing from the invention. However, for best results the variations should be kept within such limits that the lens still has, in combination, all of the following characteristics which are possessed by the lenses of both examples given, and which are believed to be significant.

1. All elements have a refractive index within the range of about 1.600 to 1.700.

2. The two elements of the rear component have refractive indices differing from each other by nearly 0.100 (actually 0.095 in both examples given).

3. The two elements of the rear component have the highest and lowest refractive indices of any of the elements in the lens, the indices of all the other elements lying appreciably inside the range limits set by the indices of the rear component.

4. The second air space $S_2$ is not less than about 0.9 and not more than about 1.3 times the first air space $S_1$.

5. The thickness $T_2$ of the second element is roughly about half of the thickness of the first air space $S_1$ and the second air space $S_2$, being not less than about 0.4 and not more than about 0.62 times the thickness of either of these air spaces.

6. The thickness $T_2$ of the second element is more than one-half the thickness $T_1$ of the first element.

7. The thickness $T_4$ of the fourth or rear element is greater than the thickness of any other element.

8. The radius $R_4$ of the rear face of the second element is less than the radii $R_1$ or $R_6$, is roughly about one-half of the radius $R_3$ (i. e., within a range of about 0.45 to 0.55 times the radius $R_3$), and is roughly about one-tenth of the radius $R_5$ (i. e., within a range of about 0.095 to 0.105 times the radius $R_5$).

Within these characteristic limits above mentioned, good results may be attained notwithstanding some variations of the radii, indices, thicknesses, spacings, etc.

We claim:

1. An objective lens comprising three components in axial alinement with each other, the front and middle components each being simple lens elements air spaced from each other and the rear component consisting of two lens elements cemented to each other to form a cemented doublet, the lens elements and their spatial relationship to each other being substantially in accordance with the data in the following table:

| Lens | N | V | Radii | Thicknesses |
|---|---|---|---|---|
| 1 | 1.638 | 55.0 | $R_1=+38.0$ | $T_1=6.6$ |
|   |       |      | $R_2=\infty$ | $S_1=6.9$ |
| 2 | 1.620 | 36.0 | $R_3=-73.0$ | $T_2=4.2$ |
|   |       |      | $R_4=+36.0$ | $S_2=8.7$ |
| 3 | 1.605 | 38.0 | $R_5=+344.0$ | $T_3=2.2$ |
| 4 | 1.700 | 48.0 | $R_6=+44.0$ | $T_4=7.2$ |
|   |       |      | $R_7=-55.1$ |  | wherein the lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, the axial thicknesses T of the respective lens elements and the axial thicknesses S of the air spaces between lens elements being given in the fifth column, the respective lens elements and air spaces to which the values of T and S apply being numbered from front to rear and being respectively identified by numerical subscripts used with T and S, the values of R, T, and S all being expressed proportionately in millimeters per 100 millimeters of equivalent focal length of the entire lens, the plus and minus values of R indicating curved surfaces which are respectively convex and concave toward the front of the lens.

2. An objective lens comprising three components in axial alinement with each other, the front and middle components each being simple lens elements air spaced from each other and the rear component consisting of two lens elements cemented to each other to form a cemented doublet, the lens elements and their spatial relationship to each other being substantially in accordance with the data in the following table:

| Lens | N | V | Radii | Thicknesses |
|---|---|---|---|---|
| 1 | 1.691 | 55.0 | $R_1=+42.0$ | $T_1=7.0$ |
|   |       |      | $R_2=\infty$ | $S_1=9.9$ |
| 2 | 1.620 | 36.0 | $R_3=-76.0$ | $T_2=4.2$ |
|   |       |      | $R_4=+37.0$ | $S_2=9.2$ |
| 3 | 1.605 | 38.0 | $R_5=+356.0$ | $T_3=2.2$ |
| 4 | 1.700 | 48.0 | $R_6=+42.0$ | $T_4=10.4$ |
|   |       |      | $R_7=-57.53$ |  | wherein the lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, the axial thickness T of the respective lens elements and the axial thicknesses S of the air spaces between lens elements being given in the fifth column, the respective lens elements and air spaces to which the values of T and S apply being numbered from front to rear and being respectively identified by numerical subscripts used with T and S, the values of R, T, and S all being expressed proportionately in millimeters per 100 millimeters of equivalent focal length of the entire lens, the plus and minus values of R indicating curved surfaces which are respectively convex and concave toward the front of the lens.

References Cited in the file of this patent

UNITED STATES PATENTS

| 721,240 | Rudolph | Feb. 24, 1903 |
| 2,158,178 | Frederick et al. | May 16, 1939 |
| 2,308,007 | Herzberger et al. | Jan. 12, 1943 |
| 2,346,086 | Schade et al. | Apr. 4, 1944 |
| 2,601,369 | Cook | June 24, 1952 |

FOREIGN PATENTS

| 682,606 | Great Britain | Nov. 12, 1952 |
| 706,605 | Great Britain | Mar. 31, 1954 |
| 714,565 | Great Britain | Sept. 1, 1954 |
| 723,367 | Great Britain | Feb. 9, 1955 |